US006862663B1

(12) United States Patent
Bateman

(10) Patent No.: US 6,862,663 B1
(45) Date of Patent: Mar. 1, 2005

(54) CACHE HAVING A PRIORITIZED REPLACEMENT TECHNIQUE AND METHOD THEREFOR

(75) Inventor: Robert D. Bateman, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 09/609,567

(22) Filed: Jun. 30, 2000

(51) Int. Cl.$^7$ .............................................. G06F 12/00
(52) U.S. Cl. ..................... 711/133; 711/100; 711/118; 711/136; 711/154
(58) Field of Search ............................. 711/100, 118, 711/123, 128, 133, 134, 136, 154, 163

(56) References Cited

U.S. PATENT DOCUMENTS

| | | | | |
|---|---|---|---|---|
| 5,283,903 A | * | 2/1994 | Uehara ....................... 710/200 |
| 5,493,667 A | * | 2/1996 | Huck et al. ................... 711/125 |
| 5,713,003 A | * | 1/1998 | DeWitt et al. ............... 711/118 |
| 5,717,893 A | * | 2/1998 | Mattson ....................... 711/129 |
| 5,905,509 A | * | 5/1999 | Jones et al. .................. 345/520 |
| 5,913,224 A | * | 6/1999 | MacDonald ................. 711/125 |
| 5,956,744 A | * | 9/1999 | Robertson et al. .......... 711/122 |
| 6,292,871 B1 | * | 9/2001 | Fuente ....................... 711/136 |
| 2001/0049771 A1 | * | 12/2001 | Tischler et al. .............. 711/133 |

FOREIGN PATENT DOCUMENTS

JP 406282448 A * 10/1994

* cited by examiner

Primary Examiner—Tuan V. Thai
(74) Attorney, Agent, or Firm—John F. Travis

(57) ABSTRACT

Briefly, in accordance with one embodiment of the invention, a method by which one or more ways of a cache may be locked so that they are not overwritten with data. Further, the ways of a cache that are locked may be given higher priority than the most recently used or accessed ways.

9 Claims, 4 Drawing Sheets

CACHE HAVING A PRIORITIZED REPLACEMENT TECHNIQUE AND METHOD THEREFOR

BACKGROUND

In order to provide customers with products that have improved capabilities, it may be desirable to improve the performance of the processor within the product so that the product may operate faster or offer new features. One technique to improve the performance of a processor is to include a cache within the core of the processor. A cache may be used to pre-fetch instructions and/or data that the processor is likely to request in upcoming instruction cycles.

When the processor requests an instruction or a piece of data, the request may be compared against a tag array to determine if the data requested is stored in the cache. If a match is found in the tag array, then a cache "hit" has occurred. Accordingly, the stored information or data may then be provided by the cache. If the requested information is not in the cache, then a cache "miss" has occurred and the information may have to be retrieved from other sources.

In some applications, it may be desirable to arrange the cache into sub-regions, commonly referred to as ways. This may provide more efficient use of the cache since portions of the cache may be designated to store more frequently requested information. If a cache miss has occurred, the information is not in one of the ways of the cache. Consequently, the information is retrieved from a slower memory source and stored in one of the ways of the cache. Often, the information is stored in the way that has been least recently used (LRU). However, conventional LRU replacement techniques do not provide any prioritization of the ways. Consequently, the least recently used way may be overwritten with the new data (e.g., victimize) even though it contains information at may be requested by the processor in the near future.

Thus, there is a continuing need for better ways to improve the efficiency of a cache.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
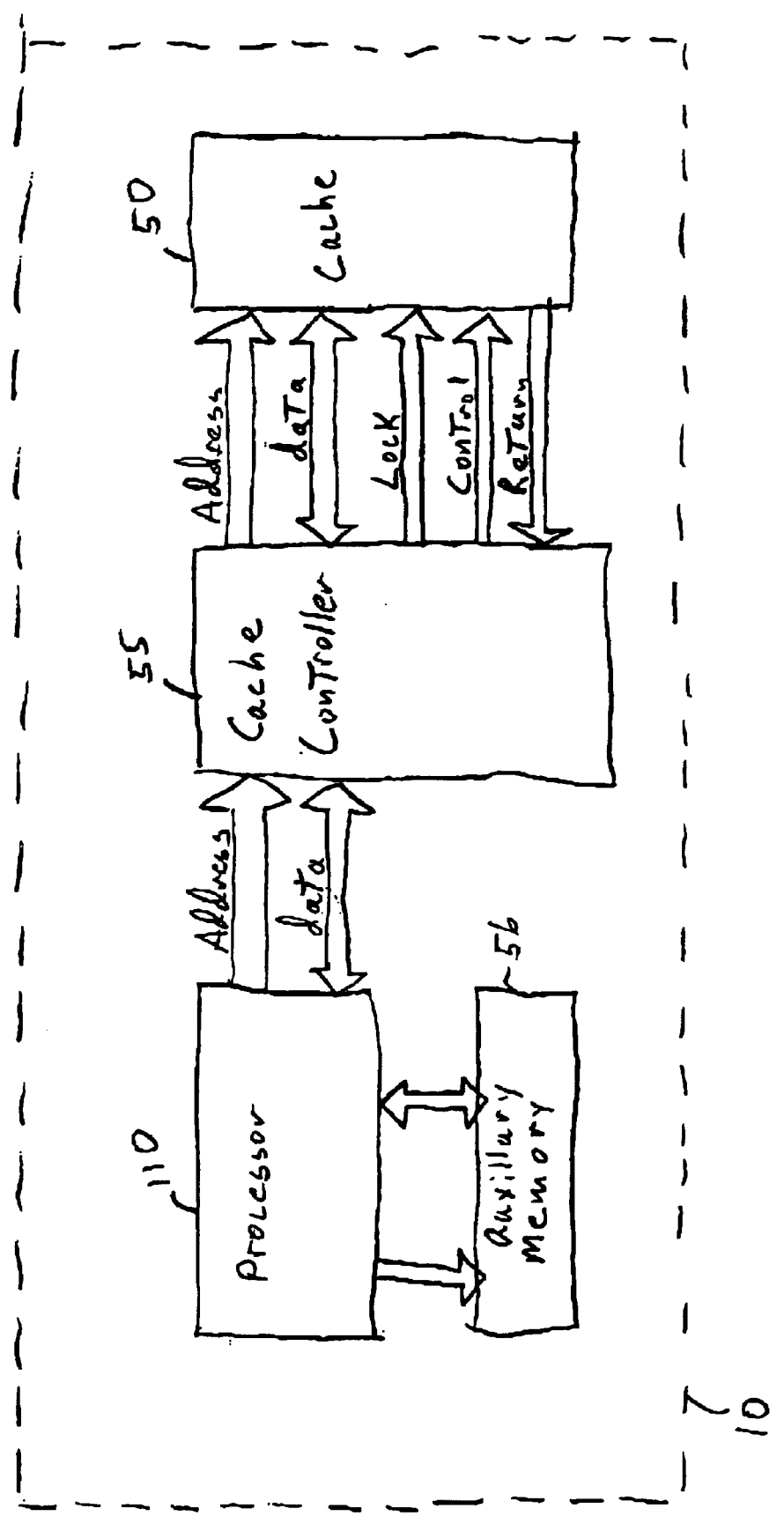
FIG. 1 is a schematic representation of an embodiment the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Note, in this description a "#" symbol is used to indicate the logical complement of a signal. For example, if BL is a logic "1," then BL# is a logic "0," although this invention is not limited to any particular signaling scheme.

Turning to FIG. 1, an embodiment 100 in accordance with the present invention is described in more detail hereinafter. Embodiment 100 may comprise a portable device, such as a mobile communication device (e.g., cell phone), a portable computer, or the like. However, it should be understood that the scope of the present invention is in no way limited to these particular applications.

Embodiment 100 here includes an integrated circuit 10 that may comprise, for example, a processor, a microprocessor, a digital signal processor, a microcontroller, or the like, hereinafter referred to as a processor 110. However, it should be understood that the scope of the present invention is not limited to these examples. Integrated circuit 10 may include a cache controller 55 that may be used to control the operation of a cache 50 and provide processor 110 with the requested information.

For example, processor may provide cache controller 55 with the address of the information requested. Cache controller 55 may provide that address along with various control signals (e.g., lock signals indicating if a way is locked, read signals, cache hit/miss signals, etc.) to determine if the requested information is in cache 50. If the information is in cache 50, it may be provided to processor 110 by cache controller 55. Otherwise, the data may have to be provided from an alternative memory 56 (e.g. a static memory array (SRAM), or the like). It should be understood that the scope of the present invention is not limited to a particular implementation of cache controller 55 or by the presence of a particular auxiliary memory 56. In addition, the scope of the present invention is not limited by the particular techniques used to transfer address or data information in integrated circuit 10. For example, address and data informal may be exchanged between processor 110, cache controller 55, and cache 50 using bi-directional buses, unidirectional buses, or the like.

Figure 2:
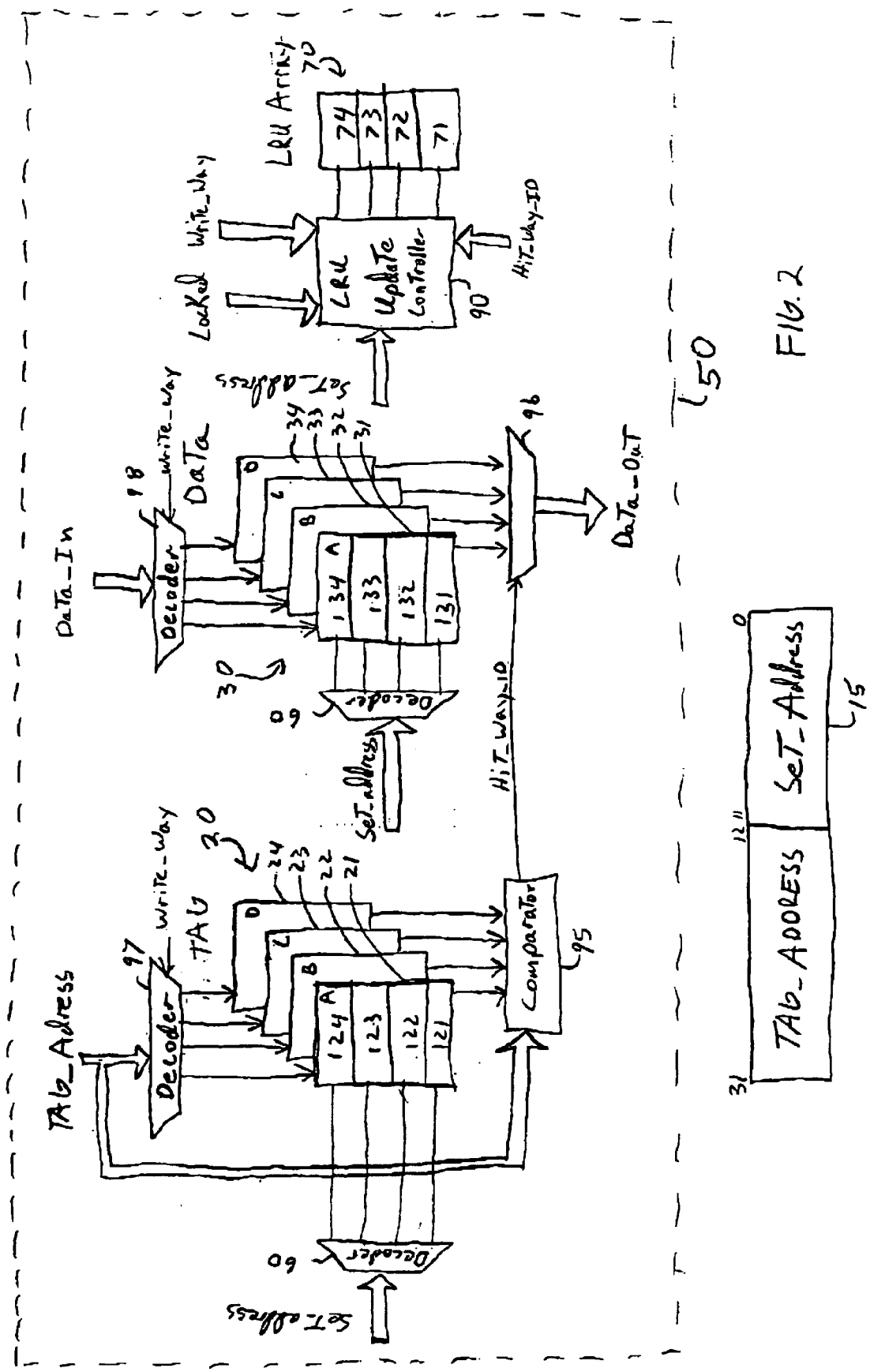
FIG. 2 is a schematic representation of a portion of a cache in accordance with an embodiment the present invention.

Referring now to FIG. 2., cache 50 may comprise a tag array 20 divided into four ways 21–24 (labeled A–D, respectively). Tag array 20 may be used to store the tag addresses corresponding to the data that is available in cache 50. Cache 50 may also have a data array 30 divided into four ways 31–34 (labeled A–D, respectively). Ways 31–34 may correspond to ways 21–24 of tag array 20. For example, the data stored in way 31 of data array 30 may correspond to the associated addresses in way 21 of tag array 20, although the scope of the present invention is not limited in this respect.

In this particular embodiment, processor 110 (see FIG. 1) may use a thirty-two bit address to request data or instructions (shown in FIG. 2 as an address 15). A portion of the address (e.g., the lower 12 bits of address 15) may be used to select the set within each of ways 21–24 and 31–35, labeled in FIG. 2 as SET_ADDRESS. The remaining portion of address 15 (e.g., the upper 20 bits) may be used to determine if the information requested by the processor is in cache 50, labeled in FIG. 2 as TAG_ADDRESS.

Accordingly, in this particular embodiment, each of ways 21–24 may contain 4 k ($2^{12}$) sets. However, only four sets 121–124 are shown in FIG. 1 for clarity. Similarly, each of ways 31–34 of data array 30 may have 4 k sets of data. However, only four sets 131–134 are shown in FIG. 2. A decoder 60 (e.g., a multiplexor) may be used to select the appropriate set 121–124 and 131–134 of ways 21–24 and 31–34, respectively, based on the logical value of the addressed used to request data, namely, SET_ADDRESS.

It should be understood, however, that the scope of the present invention is not limited by the number of ways in a cache, the number of sets or data rows in a way, or by the width of each set in the cache. One skilled in the art will understand how alternative embodiments of the present invention may provided by making the appropriate adjustments. In addition, the scope of the present invention is not limited to any particular technique for accessing tag array 20 and data array 30, and is not limited by the width of the address (e.g., address 15) that is used to request data from the cache.

Figure 3:
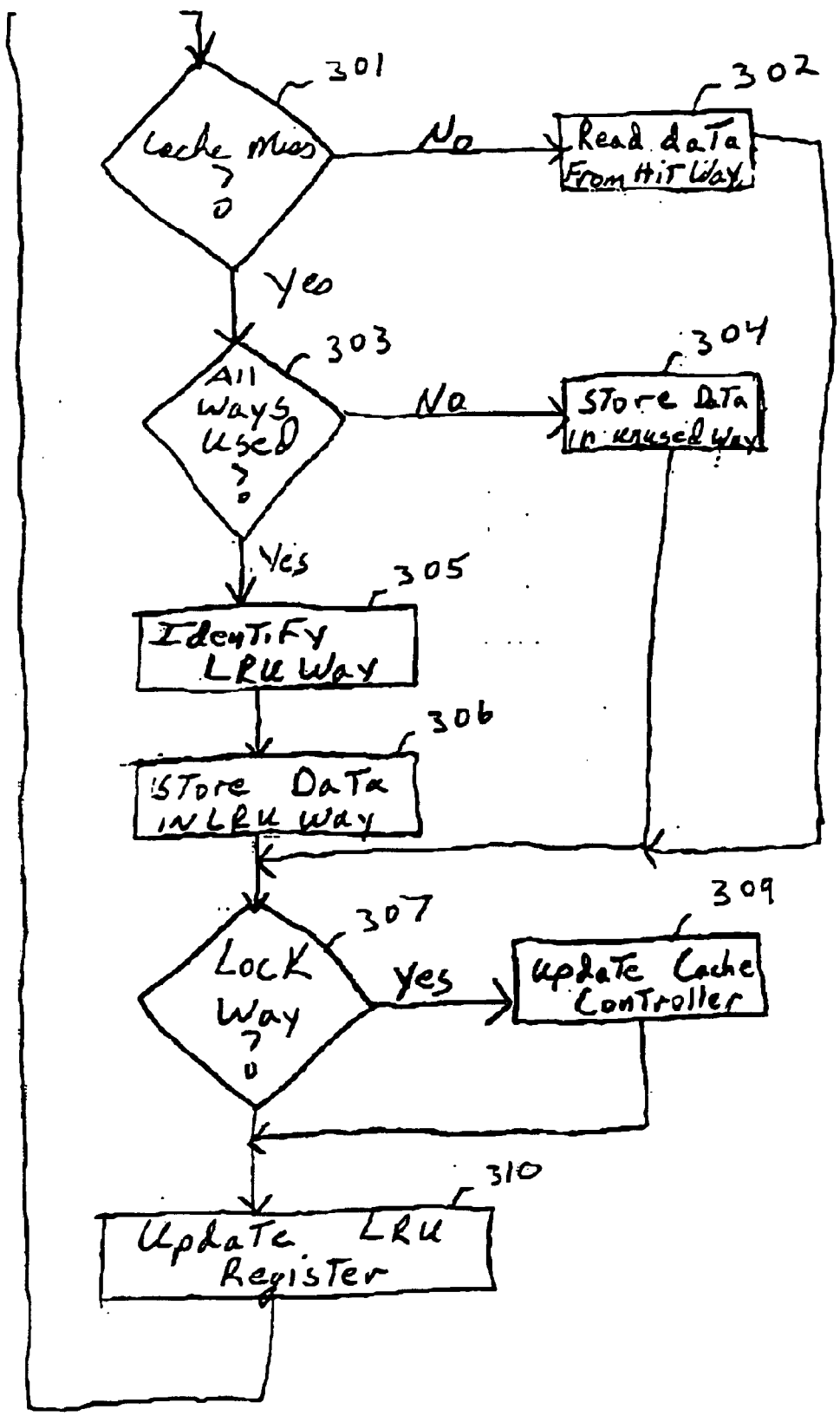
FIG. 3 is a flowchart of updating a cache in accordance with an embodiment of the present invention.

A method for storing data in cache 50 in accordance with an embodiment of the present invention is provided with reference to FIGS. 1–3. When processor 110 (see FIG. 1) requests information from cache 50 it provides an address (e.g., address 15) indicating the location of the information in memory. Cache controller 55 may first determine if the requested information is in cache 50 (e.g., a cache hit) or if the information is not available from cache 50 (e.g., a cache miss), block 301 of FIG. 3.

When integrated circuit 10 begins operating, cache 50 may not contain any information if cache 50 is not initialized before processor 110 begins requesting information. Consequently, the initial requests of information by processor 110 may result in a cache miss until ways 31–34 of cache 50 are loaded with data. Until all of ways 31–34 of data array 30 are stored with data, there may be no reason to overwrite one of the ways 31–34 that already contains data, block 303, although the scope of the present invention is not limited in this respect. Thus, in this particular embodiment the requested data may be stored in one of unused ways 31–34 if one of ways 31–34 is empty, block 304.

However, If a cache miss has occurred and one of ways 31–34 is not available, then one of ways 31–34 may be victimized (e.g., overwritten) to store the information that was recently requested by processor 110. Although the scope of the present invention is not limited in this respect, the new information is stored in the way of cache 50 that is the least recently used (LRU). This may be more efficient for some applications because the other ways may contain information that has been more recently requested by processor 110, and thus, may be more likely requested by processor 100 in an upcoming instruction cycle.

In this particular embodiment of the present invention, the identity of the least recently used way may be provided, at least in part, to cache controller 55 by the logical valued stored in a Least Recently Used (LRU) array 70 (see FIG. 2). LRU array 70 may comprise LRU registers 71–74 that correspond to the priorities of the sets 131–134 of data array 30, respectively. For example, LRU register 71 may indicate the relative priority of set 131 in ways 31–34 of data array 30.

Although the scope of the present invention is not limited in this respect, LRU registers may comprise six bits that indicate the priority of one of ways 31–34 relative to another of ways 31–34. In this particular embodiment, data array 30 may have four ways, thus, there may be a total six possible combinations of ways that are compared (e.g., way 32 relative to way 31, way 33 relative to way 31, way 33 relative to way 32, way 34 relative to way 33, way 34 relative to way 32, and way 34 relative to way 31). Table 1 is provided to illustrate an example of how the bits of an LRU register 71–74 may be used to indicate the priority of ways 31–34.

TABLE 1

| LRU Register [#] Bit Number | Represents |
|---|---|
| LRU Register [5] | Is way 32 more recently used than way 31? |
| LRU Register [4] | Is way 33 more recently used than way 31? |
| LRU Register [3] | Is way 33 more recently used than way 32? |
| LRU Register [2] | Is way 34 more recently used than way 33? |
| LRU Register [1] | Is way 34 more recently used than way 32? |
| LRU Register [0] | Is way 34 more recently used than way 31? |

For example, if the information most recently requested by processor 110 is stored in way 31, then the LRU register bits[5, 4, and 0] may be set to a logical '0' to indicate that none of these conditions are true since way 31 has been more recently used then ways 32–34. Likewise, if the next request of processor 110 results in information being stored in way 32, then LRU register bits[5] may be set to a logical '1' to indicate the condition is true, and LRU register bits[3 and 1] may be set to a logical '0' to indicate that these conditions are false. Thus, if ways 31–34 are loaded in sequential, ascending order (e.g., way 31 first, way 34 last), then the corresponding LRU register may have a logical value of '111111.' However, it should be understood that the scope of the present invention is not limited to a particular arrangement of representation by LRU registers 71–74. Similarly, the present invention is not limited by the number of bits that are in LRU registers 71–74. In alternative embodiments, the number of bits in LRU registers 71–74 may be changed as desired for caches having more or less than four ways.

Continuing with the example provided above, H the most recent accesses of ways 31–34 had been in sequential, ascending order, then way 31 may be the least recently used way and may be identified to cache controller 55 (FIG. 1) as the way to be used to store the information most recently requested by processor 110, block 305 of FIG. 3. Cache controller 55 may then store the information in the least recently used of ways 31–34, block 306.

Particular embodiments of the present invention provide a programmer with the ability to lock a way of a cache (e.g., ways 31–34) once it has been loaded with information, block 307. This may be desirable to protect a way from being overwritten even if it becomes the least most recently used. For example, one of ways 31–34 may contain information that is not currently being requested by processor 110, but may be requested in the near future. Although the scope of the present invention is not limited in this respect, a user may lock one of ways 31–34 by notifying cache controller 55, block 309. For example, the user may set a bit in a register (e.g., Lock[#]) that is used by cache controller 55 to keep track of which of ways 31–34 may be locked. Register Lock[#] may comprise a bit indicating if ways 31–34 are locked or if they may overwritten upon the occurrence of a cache miss. It should also be understood that in alternative embodiments of the present invention, a user may desire to lock more than one of ways 31–34.

After a set 131–134 of ways 31–34 has been accessed (e.g., either through a cache read or write), the corresponding LRU register 71–74 may be updated to reflect the change in priorities of ways 31–34, bock 310. As shown in FIG. 2, cache 50 may include a LRU update controller 90 that may be used to update the logical value stored in LRU array 70. LRU update controller 90 may receive signals from cache controller 55 that indicate which of ways 31–34 has been accessed. It should also be understood that in alternative embodiments of the present invention one or more of ways 31–34 may locked or unlocked at any point after the particular way has been loaded with data. In this particular embodiment, the highest priority is given to a way (e.g., one of ways 31–34) that is locked, although the scope of the present invention is not limited in this respect. For example, a way that is locked is given higher priority over the most recently accessed way. Thus, LRU update controller 90 may indicate that a locked way is the highest priority (e.g., most recently used) even though it has not been accessed by processor 110 during one of the recent requests for information.

In this particular embodiment, there may be some situations where more than one of ways 31–34 may be locked. If two or more ways 31–34 are locked, LRU update controller 90 may be arranged to assign priority using different techniques (e.g., assign priority by ascending order, descending order, least recently used, etc.). It should also be understood that there may be situations where the most recently used way 31–34 of data array 30 may actually be given the lowest priority in the corresponding LRU register 71–74 if the other arrays are locked.

Table 2 is provided to illustrate one technique for determining the logical value of the bits in LRU register 71–74. In this table, "Way[n]" is used to indicate which of ways 31–34 is the most recently used. "Lock[n]" and "Lock[n]#" are used to indicate which of ways 31–34 are locked or not locked. respectively.

TABLE 2

| LRU Register [#] Bit Number | Represents |
|---|---|
| LRU Register [5] | Lock[31] OR (Way[31] AND Lock[32]#) |
| LRU Register [4] | Lock[32] OR (Way[32] AND Lock[33]#) |
| LRU Register [3] | Lock[31] OR (Way[31] AND Lock[33]#) |
| LRU Register [2] | Lock[33] OR (Way[33] AND Lock[34]#) |
| LRU Register [1] | Lock[32] OR (Way[32] AND Lock[34]#) |
| LRU Register [0] | Lock[31] OR (Way[31] AND Lock[34]#) |

Figure 4:
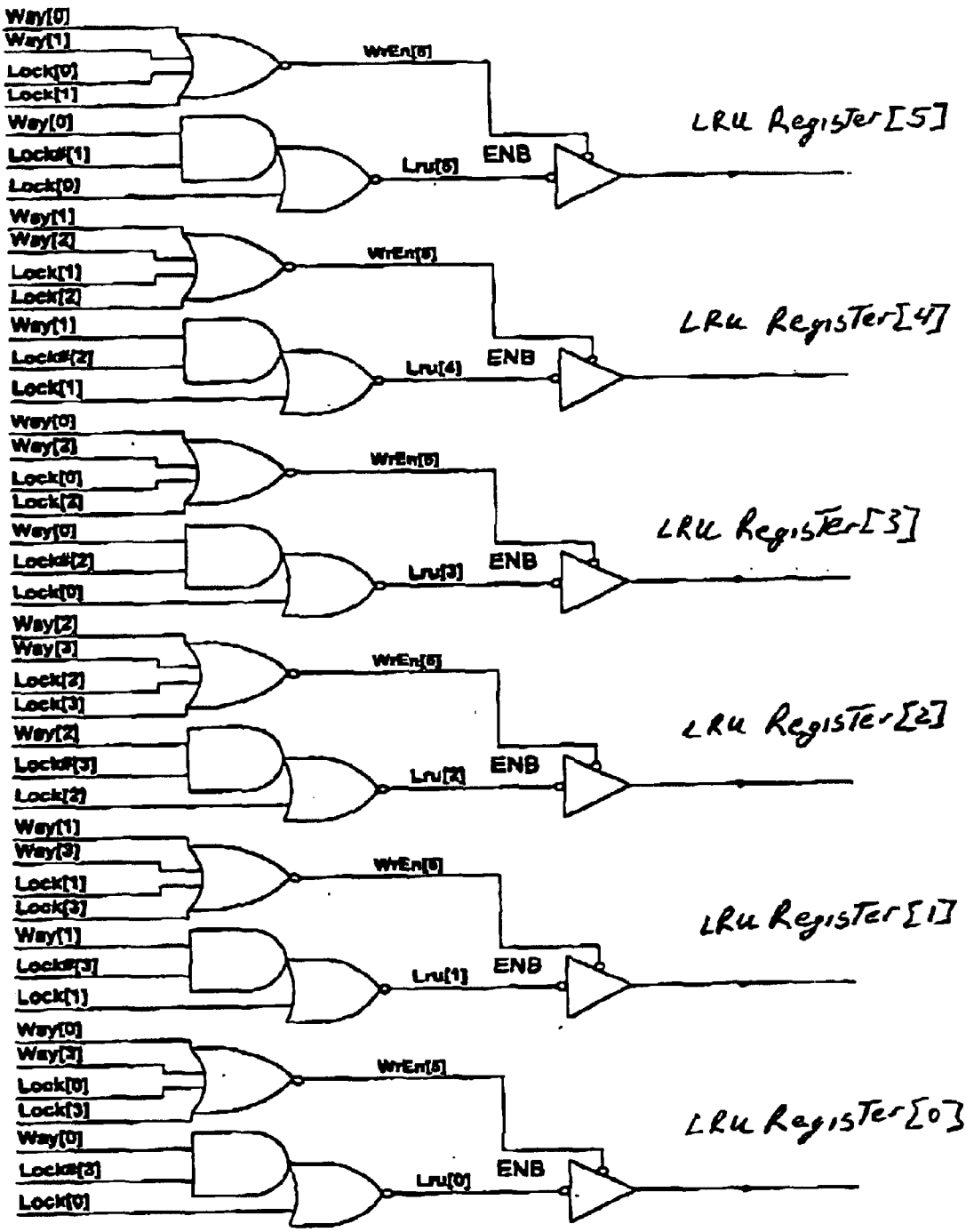
FIG. 4 is a schematic or a circuit that may be used in accordance with an embodiment of the present invention.

FIG. 4 is provided as an example of how the bits of LRU register 71–74 may be updated to reflect a read or write of one of ways 31–34 in cache 50, although the scope of the present invention is not limited to this particular implementation as other techniques, including software, may be used. For example, Table 1 indicates that the fifth bit of LRU register 71–75 (e.g., LRU Register[5]) may be updated if either way 31 or way 32 is the most recently used way of cache 50 or if either of way 31 or way 32 are locked. Accordingly, the appropriate input signals may be used to determine if LRU Register[5] is updated. As indicated in FIG. 4, the update logic may allow for the prioritizing of a locked way higher than a least recently used way. Further, the logic may also prioritize a locked way higher even if is not the most recently used way, although it should be understood that the scope of the present invention is not limited in this respect. In alternative embodiments, is may be desirable to prioritize ways 31–34 in a different order depending on which ones are locked and which is the most recently used.

Referring now to FIGS. 2–3, a request for information from processor 110 to cache 50 may begin by providing the TAG_ADDRESS to a comparator 95. The SET_ADDRESS may be provided to decoder 60 so that the appropriate set 121–124 of tag array 20 are selected. Comparator 90 may then determine if the value stored in the corresponding set 121–124 of ways 21–24 is sufficiently similar to the TAG_ADDRESS. If a match is found, block 302 of FIG. 3, comparator 90 may indicate which of ways 31–34 is a match (e.g., signal HIT_WAY_ID) to allow multiplexor 96 to provide the data stored in the corresponding way 31–34 of data array 30 as the output data (e.g., DATA_OUT). Comparator 95 may also notify LRU update controller 90 of the occurrence of a cache hit, and the identification of the most recently used way 31–34 so that the corresponding LRU register 71–74 of LRU array 70 may be updated.

If the TAG_ADDRESS does not match any of the logical values stored in ways 21–24 of tag array 20, then a cache miss may have occurred. Accordingly, the logical value stored in the corresponding LRU register 71–74 may be provided to cache controller 55 to identify which of ways 31–34 is to be victimized. Cache controller 55 may use control signals (e.g., Write_Way) to enable decoders 97 and 98 to store the most recent TAG_ADDRESS and data in the least recently used way 21–24 and 31–34 of tag array 20 and data array 30. Thereafter, LRU update controller 90 may update the logical value stored in the corresponding LRU Register 71–74.

By now it should be appreciated that particular embodiments of the present invention provides a method by which one or more ways of a cache may be locked so that they are not overwritten with data. Further, particular embodiments of the present invention may prioritize the ways of a cache so that locked ways are given higher priority than the most recently used or accessed ways. This may improve the efficiency of a cache by permitting a user to protect some of the data store in the cache while using a lest recently used storage technique for the remaining ways. Accordingly, the number of cache hits may be increased and the operational performance of a processor (e.g., processor 110) may be improved.

While certain features of the invention have been illustrated and described herein, many modifications, substitutions, changes, and equivalents will now occur to those skilled in the art. For example, in alternative embodiments it may be desirable to prioritize a locked way lower than the most recently used way. It is, therefore, to be understood that the appended claims are intended to cover all such modifications and changes as fall within the true spirit of the invention.

What is claimed is:

1. A method for storing data in a cache comprising:
prioritizing a locked way of the cache higher than a recently used way;
prioritizing an additional locked way higher than the locked way;
setting a first bit to indicate priority of the locked way;
setting a second bit to indicate priority of the additional locked way; and
setting a third bit to indicate priority of said recently used way;
wherein prioritizing the locked way, the additional locked way and the least recently used way includes setting correspondent bits in a register associated with said ways.

2. The method of claim 1, further comprising storing data in the recently used way.

3. The method of claim 1, further comprising:
prioritizing the locked way higher than a least recently used way; and
storing data in the least recently used way.

4. The method of claim 1, further comprising locking at least one way of the cache to provide the locked way.

5. The method of claim 1, further comprising reading data from a way of the cache prior to prioritizing the locked way, the way being the recently used way.

6. The method of claim 1, further comprising setting a bit in a register to indicate priority of the recently used way.

7. The method of claim 1, further comprising writing data to a way of the cache prior to prioritizing the locked way, the way being the recently used way.

8. A method comprising:
locking a first way of a cache;
locking a second way of the cache;
accessing a third way of the cache;
prioritizing said first way of the cache higher than a recently used way;
prioritizing said second way of the cache higher than the first way;
setting a first bit to indicate priority of the first way;
setting a second bit to indicate priority of the second way; and
setting a third bit to indicate priority of the recently used way;
wherein prioritizing the first way, the second way and the least recently used way includes setting correspondent bits in a register associated with said ways.

9. An apparatus for locking and prioritizing data comprising:
a central processing unit;
a cache memory having a plurality of ways coupled to said central processing unit;
a cache controller for locking a first way and a second way and for prioritizing the second locked way higher than the first locked way; wherein priority of the first locked way is higher than a recently used way;
a register having a plurality of bits for indicating priority associating with each way within said cache memory;
wherein said cache controller further setting a first bit in said register to indicate priority of the first way, a second bit to indicate priority of the second way, and a third bit to indicate priority of said recently used way.

* * * * *

UNITED STATES PATENT AND TRADEMARK OFFICE
CERTIFICATE OF CORRECTION

PATENT NO. : 6,862,663 B1
DATED : March 1, 2005
INVENTOR(S) : Bateman

It is certified that error appears in the above-identified patent and that said Letters Patent is hereby corrected as shown below:

Column 1,
Line 34, delete "victimize" and insert -- victimized --.
Line 35, delete "at" and insert -- that --.

Column 3,
Line 34, delete "informal" and insert -- information --.

Column 4,
Line 4, before "provided", insert -- be --.

Column 5,
Line 31, delete "H" and insert -- if --.

Signed and Sealed this

Twenty-fourth Day of May, 2005

JON W. DUDAS
*Director of the United States Patent and Trademark Office*